United States Patent
Schindewolf et al.

(10) Patent No.: US 11,533,168 B2
(45) Date of Patent: Dec. 20, 2022

(54) SYSTEM AND METHOD FOR UNLOCKING AN ENCRYPTION KEY CHAIN WITHOUT COMPROMISING SECURITY

(71) Applicant: SAP SE, Walldorf (DE)

(72) Inventors: Martin Schindewolf, Walldorf (DE); Meinolf Block, Heidelberg (DE); Christoph Höhner, Schwetzingen (DE); Sascha Zorn, Neulußheim (DE)

(73) Assignee: SAP SE, Walldorf (DE)

(*) Notice: Subject to any disclaimer, the term of this patent is extended or adjusted under 35 U.S.C. 154(b) by 485 days.

(21) Appl. No.: 16/723,466

(22) Filed: Dec. 20, 2019

(65) Prior Publication Data
US 2021/0194678 A1    Jun. 24, 2021

(51) Int. Cl.
*H04L 9/08* (2006.01)
*G06F 16/27* (2019.01)
*G06F 16/25* (2019.01)
*G06F 21/62* (2013.01)

(52) U.S. Cl.
CPC ............ *H04L 9/0825* (2013.01); *G06F 16/25* (2019.01); *G06F 16/278* (2019.01); *G06F 21/6218* (2013.01); *H04L 9/0822* (2013.01)

(58) Field of Classification Search
CPC ..... H04L 9/0825; H04L 9/0822; G06F 16/25; G06F 16/278; G06F 21/6218; G06F 21/6209
See application file for complete search history.

(56) References Cited

U.S. PATENT DOCUMENTS

| | | | |
|---|---|---|---|
| 2018/0041477 A1* | 2/2018 | Shaposhnik | G06F 21/53 |
| 2019/0087600 A1* | 3/2019 | Sion | H04L 9/0891 |
| 2019/0121887 A1* | 4/2019 | Beier | G06F 16/2291 |
| 2021/0042437 A1* | 2/2021 | Al-Mousa | G06F 21/602 |

* cited by examiner

*Primary Examiner* — Abiy Getachew
(74) *Attorney, Agent, or Firm* — Sterne, Kessler, Goldstein & Fox P.L.L.C.

(57) ABSTRACT

The system described herein provides for storing the databases and encryption keys for decrypting the data in the databases into two separate partitions. In an embodiment, the first partition includes the databases while the second partition includes a configuration database and a payload database. The payload database stores a data encryption key for decrypting the data stored in the databases. The payload database is encrypted and may be decrypted using a body encryption key. The body encryption key itself is encrypted twice. In the first instance a key encryption key is generated and in the second instance a second access key is generated. The key encryption key or the second access key may be used to decrypt the body encryption key. The second access key is stored in a secure location, to be retrieved in situations when the key encryption key is inaccessible.

20 Claims, 8 Drawing Sheets

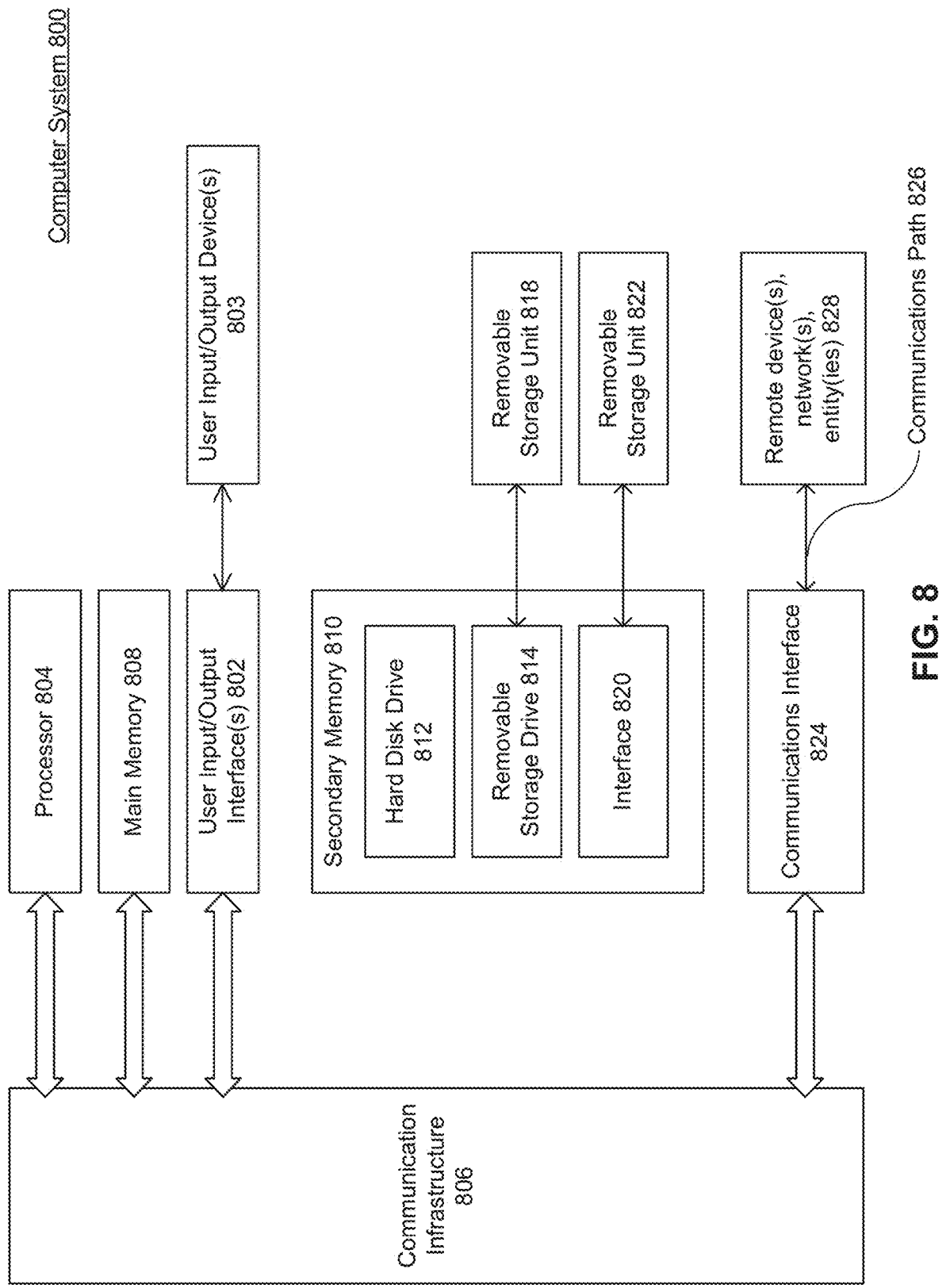

SYSTEM AND METHOD FOR UNLOCKING AN ENCRYPTION KEY CHAIN WITHOUT COMPROMISING SECURITY

BACKGROUND

Databases used to store sensitive data may employ a form of encryption as a way of protecting the data. A common form of encryption that is often is used is asymmetric encryption. Asymmetric encryption uses key pairs to encrypt data. The key pair includes a public key to encrypt the data and a private key to decrypt the data. Anyone accessing the data would be required to use a private key, or similar mechanism, in order to decrypt the data for read access.

Entities such as corporations or companies may encrypt sensitive data stored in a database using the public key and store the private key in a secure location. The entities may provide certain users who have the appropriate privileges or clearances, with access to the private key to decrypt the encrypted data stored in the database. Likewise, the entities may also prevent certain users who do not have the appropriate privileges or clearances, from gaining access to the private key so they would not be able to decrypt the encrypted data.

In conventional systems, entities may store the encryption keys in a secure location that is accessible to any user who has access to the database itself, irrespective of whether the user has the appropriate privileges or clearances. This creates security risks as a user (such as a database or system administrator) who has access to the database but does not have the appropriate privileges or clearances may access to the private key and use the encryption key to decrypt the encrypted data stored in the database.

BRIEF DESCRIPTION OF THE DRAWINGS

The accompanying drawings, which are incorporated herein and form a part of the specification, illustrate the embodiments of the present disclosure, and together with the description, further serve to explain the principles of the embodiments and enable a person skilled in the pertinent art to make and use the embodiments, individually, or as a combination thereof.

FIG. 8 is a block diagram of example components of a computing system according to an embodiment.

In the drawings, like reference numbers generally indicate identical or similar elements. Additionally, generally, the left-most digit(s) of a reference number identifies the drawing in which the reference number first appears.

DETAILED DESCRIPTION

Figure 1:
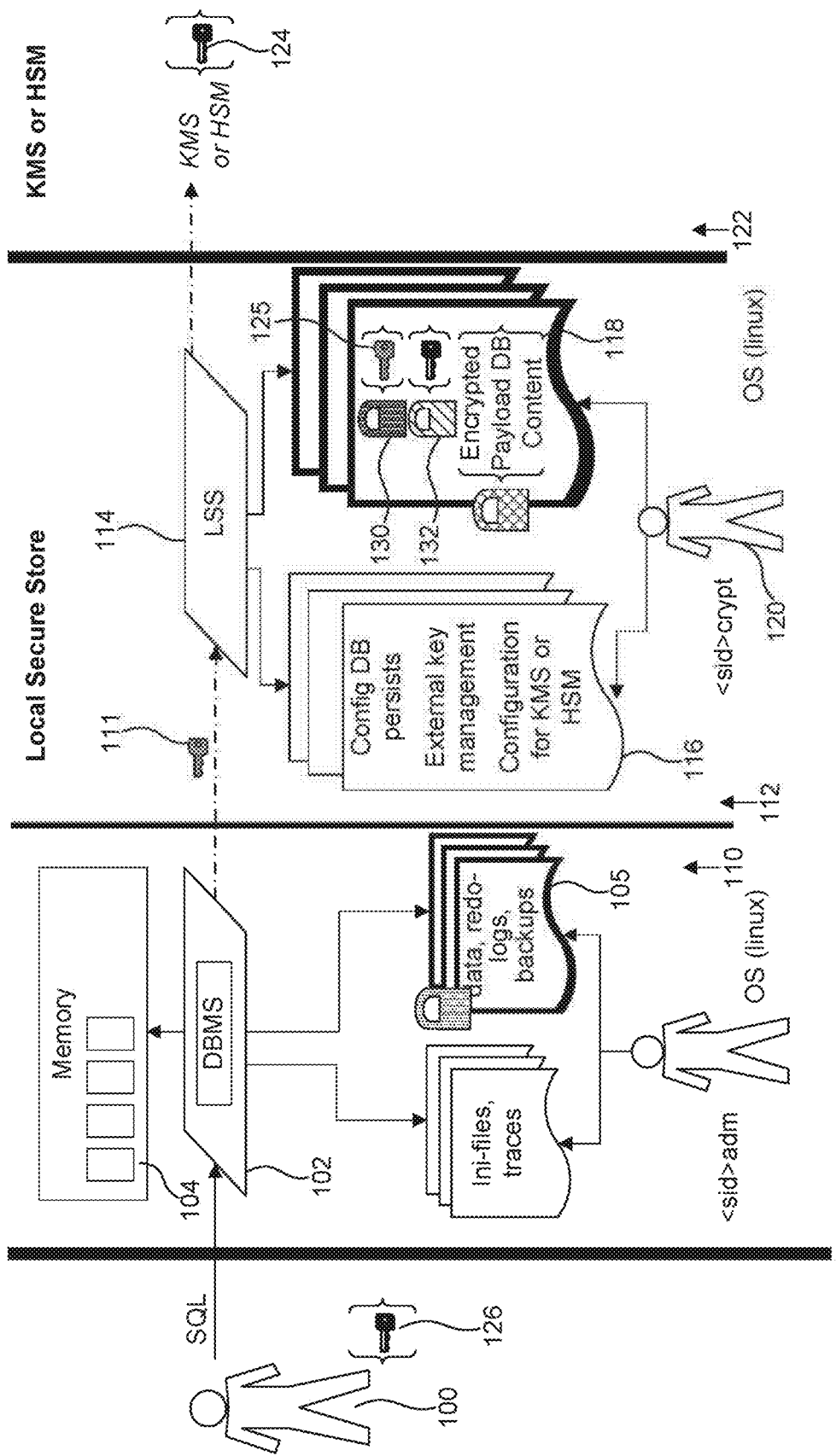
FIGS. 1-2 are block diagrams of a system for unlocking an encryption key chain according to an example embodiment.

Provided herein are system, apparatus, device, method and/or computer program product embodiments, and/or combinations and sub-combinations thereof for accessing private keys.

Databases may store sensitive data which may be encrypted using various encryption techniques such as symmetric or asymmetric encryption. The data may be decrypted using a private key or a symmetric key.

Furthermore, external Key Management Systems (KMS) or Hardware Security Modules (HSM) may be used to manage private keys for decrypting the data stored in the database. However, a user may be unable to decrypt the data if the private key is lost or is damaged so that it can't be used for decryption anymore, if the provider of the external key management system goes out of business, if the provider gets compromised in a way that the private key is unusable (internal or external threats, crypto hijacking, . . . ), or if the key gets lost before a backup is made on the external system.

The system described herein provides for bifurcating the databases and the storage of the private keys into two separate partitions. The first partition may include a database management system (DBMS) and the databases while the second partition may be a Local Secure Store (LSS) including a configuration database and a payload database. Accounts associated with the first partition may not have visibility or access to the second partition. Accounts associated with the second partition may not have visibility or access to the first partition. By doing so, the database administrator may not have access to decrypted data and may be able to handle/resolve database errors or exceptions. Likewise, an LSS system administrator may not be able to view the encrypted data but may be able to handle/resolve errors or exceptions generated in the LSS.

The payload database may be encrypted using a symmetric key. The symmetric key may be a body encryption key. The body encryption key may be encrypted two separate times using an asymmetric key pair. In the first instance in which the body encryption key is encrypted, a private key, key encryption key, may be generated. In the second instance in which the body encryption key is encrypted, a private key, second access key, may be generated. Either the key encryption key or the second access key may decrypt the body encryption key.

The body encryption key may decrypt the contents of the payload database. The configuration database may provide the key encryption key for decrypting the body encryption key. The payload database may store a data encryption key for decrypting the data in the databases.

Alternatively, an external system may store the key encryption key for decrypting the body encryption key. The external system may receive encrypted header information of the payload database storing the body encryption key and decrypt the header information to access the body encryption key using the key encryption key of the payload database. The external system may provide the body encryption key for accessing the contents of the payload database.

Furthermore, a second access may be used to decrypt the body encryption key. A client may store this second access key in a secure location. In the event the external system is inaccessible, the client may use the second access key to decrypt the body encryption key to access the payload database. For example, the client may use the second access key if the key encryption key stored by the external system is lost or is damaged so that it can't be used for decryption anymore, if the provider of the external key management system goes out of business, if the provider gets compromised in a way that the private key is unusable (internal or external threats, crypto hijacking, . . . ), or if the key encryption key gets lost before a backup is made on the external system. By doing so, the client does not have to worry about not being able to decrypt the data due to the external system failing to decrypt the body encryption key.

Figure 2:
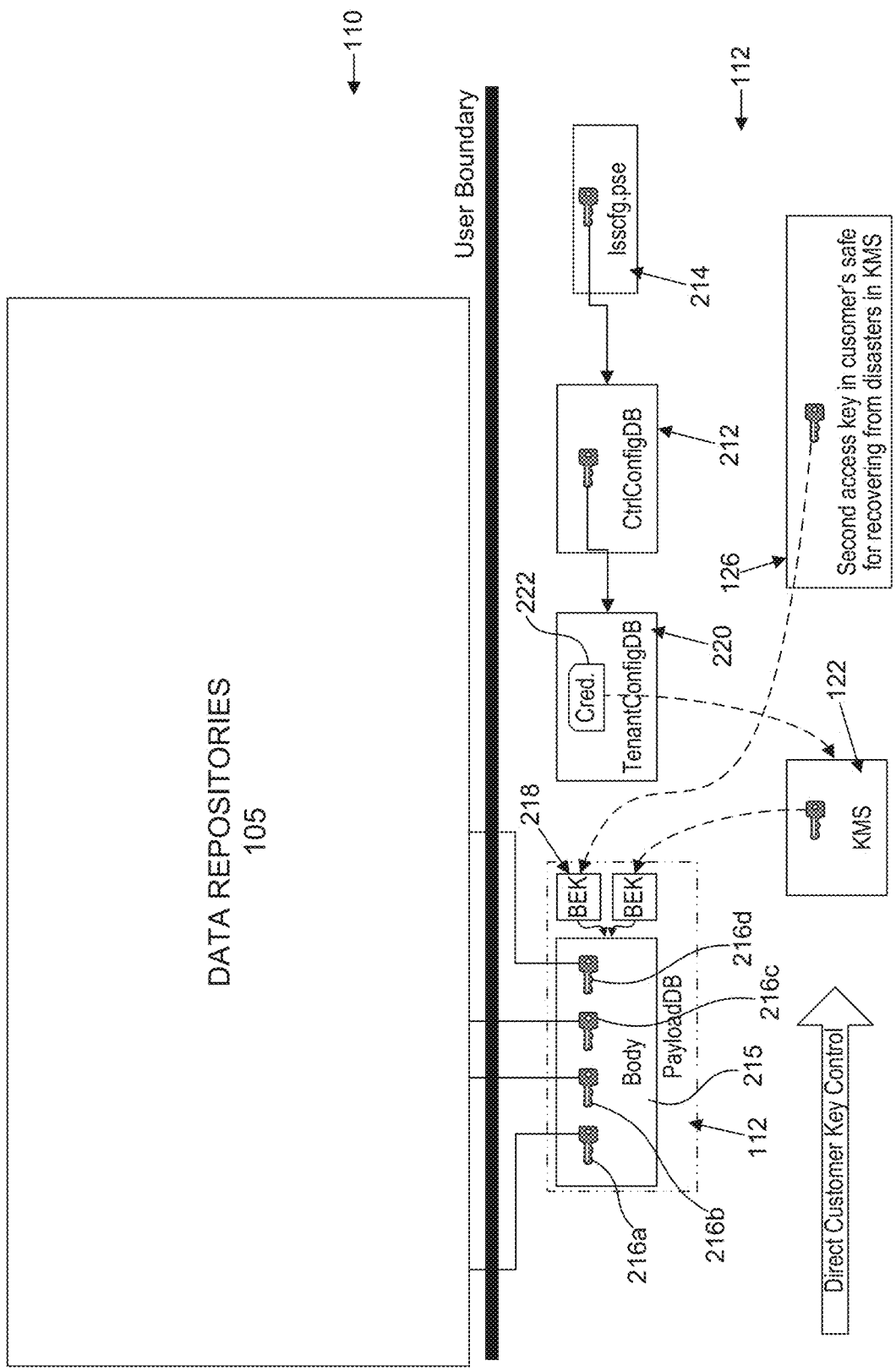

FIGS. 1-2 are block diagrams of a system unlocking an encryption key chain according to an example embodiment. With reference to FIG. 1, the system may include a client 100, a DBMS 102, memory 104, data repositories 105, ini-files 106, and database administrator account 108. The DBMS 102, memory 104, data repositories 105, ini-files 106, and database administrator account 108, may be located in a first partition 110 of a computing system. The ini-files 106 may include configuration information for the data repositories 105. The system may further include a second partition 112 of the computing system. The second partition 112 of the computing system may be a local secure store (LSS) configured to store private keys for decrypting encrypted data stored in data repositories. The second partition 112 may include an LSS engine 114, configuration database 116, payload database 118, and LSS system administrator account 120. The system may further include an external system 122 such as a key management system (KMS) or hardware security module (HSM). The external system 122 may be configured to manage private keys.

In an embodiment, the data stored in the data repositories 105 may be encrypted. In one example, the data may be encrypted using symmetric encryption or asymmetric encryption. The data may be decrypted using a data encryption key 111. The data encryption key 111 may be a private key or a symmetric key. The system administrator account 108 may be tied to a database administrator configured to provide maintenance to the data repositories 105. However, the database administrator may have visibility into the encrypted data stored in the data repositories 105. The system administrator account 108 may not have access or visibility into the second partition 112 including the LSS engine 114, configuration database 116, and payload database 118. In this regard, the system administrator account 108 may not have access to the data encryption key 111 to decrypt the data stored in the data repositories 105.

The payload database 118 may store the data encryption key 111 used to decrypt the data stored in the data repositories 105. The payload database may store also store certificates, settings, or other configuration information associated with the data stored in the data repositories 105. The payload database 118 may be encrypted using symmetric encryption. A body encryption key 125 may be required to access the payload database 118. The body encryption key 125 used to decrypt the contents of the payload database 118 may be encrypted in two different instances using asymmetric encryption. The body encryption key 125 may be stored in the header information of the payload database 118. The header information may be encrypted in two instances, resulting in encrypted header information 130 and encrypted header information 132. A private key, key encryption key 124, stored by the external system 122 or configuration database 116, may be used to decrypt the encrypted header information 130 to access the body encryption key 125. A private key, second access key 126, stored in a secure location by the client, may be used to decrypt the header information 132 to access the body encryption key 125. In this regard, the body encryption key 125 may be accessed using either the key encryption key 124 or the second access key 126.

The LSS system administrator account 120 may be tied to a LSS system administrator who manages the LSS. The LSS administrator account 120 may have visibility to the private keys stored in second partition 112. The LSS administrator account 120 may not access or have visibility into the first partition 110 including the DBMS 102, memory 104, data repositories 105, and ini-files 106.

The client 100 may maintain storage to the second access key 126. In the event, the key encryption key 124 is inaccessible to the client 100, the client use the second access key 126 to decrypt the encrypted header information 132 including the body encryption key 125. The body encryption key 125 may decrypt the contents of the payload database 118. The second access key 126 may be generated by the client 100. Alternatively, the second access key 126 may be generated and provided to the client. The second access key 124 may be embedded in a QR code, included in a link, or in a document. The second access key 124 may be stored by the client 100 in a secure environment. The second access key 124 may be stored in a virtual vault, jailed environment, physical vault, and/or the like.

In an embodiment, the DBMS 102 may execute a procedure. The procedure may attempt to access the encrypted data stored in the data repositories 105. The procedure may be executed in response to a request transmitted by the client 100. Alternatively, the procedure may be executed automatically. In response to the procedure attempting to access the data stored in the data repositories, the procedure may execute a call to the local secure store (LSS) in the second partition 112.

The LSS engine 114 may receive the call, including a request to access the data encryption key 111 to decrypt the encrypted data in the data repositories 105. The call may be transmitted through abstract sockets. The data encryption key 111 may be stored in the payload database 118. The LSS engine 114 may attempt to retrieve the key encryption key 124 to access the payload database 118 using the configuration database 116. The configuration database 116 may be encrypted using asymmetric encryption. The LSS engine 114 may access a file stored in the second partition 112 to retrieve a private key to decrypt the contents of the configuration database 116.

In an embodiment, the configuration database 116 may store the key encryption key 124 for accessing the payload database 118. In response to decrypting and accessing the configuration database 116, the LSS engine 114 may retrieve the key encryption key 124. The LSS engine 124 may use the key encryption key 124 to decrypt the encrypted header information 130 to access the body encryption key 125. The body encryption key 125 may be used to decrypt and access the contents of the payload database 118. The LSS engine 114 may retrieve the data encryption key 111 and transmit the data encryption key 111 to the DBMS 102. In an embodiment, the LSS engine 114 may also retrieve certificates or settings associated with the data stored in the data repositories 105, from the payload database 118. The certificates or settings may be configurations. The LSS engine 114 may transmit the certificates or settings along with the data encryption key 111. The DBMS 102 may use the data encryption key 111 to decrypt the data stored in the data repositories 105. The DBMS 102 may also use the certificates or settings to access the data in the data repositories 105.

In an embodiment, the configuration database 116 may store a configuration for accessing the key encryption key 124 from the external system 122. The configuration may be a link for accessing the external system 122. The LSS engine 114 may access the external system 122 using the configuration and transmit encrypted header information 130 for the payload database 118 to the external system 122. The external system 122 may decrypt the encrypted header information 130 using the key encryption key 124 to access the body encryption key 125. The external system 122 may transmit the body encryption key 125 to the LSS engine 114. The LSS engine 114 may use the body encryption key 125 to decrypt and access the data encryption key 111 stored in the payload database 118. In an embodiment, the LSS engine 114 may also retrieve certificates or settings associated with the data stored in the data repositories 105, from the payload database 118. The certificates or settings may be configurations. The LSS engine 114 may transmit the certificates or settings along with the data encryption key 111 stored in the payload database 118. The DBMS 102 may use the data encryption key 111 to decrypt the data stored in the data repositories 105. The DBMS 102 may also use the certificates or settings to access the data in the data repositories 105.

In an embodiment, the LSS engine 114 may be unable to access the external system 122 for reasons described above. In this case, the DBMS 102 may request the second access key 126 from the client 100. The second access key may be copied from the client 100 to a directory readable by a LSS system administrator. The LSS engine 114 may access the second access key 126 and use the second access key 126 to decrypt the encrypted header information 132 to retrieve the body encryption key 125. The LSS engine 114 may use the body encryption key 125 to decrypt and access the data encryption key 111 stored in the payload database 118. In an embodiment, the LSS engine 114 may also retrieve certificates or settings associated with the data stored in the data repositories 105, from the payload database 118. The certificates or settings may be configurations. The LSS engine 114 may transmit the certificates or settings along with the data encryption key 111 stored in the payload database 118. The DBMS 102 may use the data encryption key 111 to decrypt the data stored in the data repositories 105. The DBMS 102 may also use the certificates or settings to access the data in the data repositories 105.

In an embodiment, the data repositories 105 may include multiple tenants. The second partition 112 may store multiple configuration databases 116 and multiple payload databases 118, each corresponding to a tenant. For example, the DBMS 102 may execute a procedure. The procedure may attempt to access the encrypted data stored in the data repositories. In response to the procedure attempting to access the data stored in the data repositories, the procedure may execute a call to the local secure store in the second partition 112. The procedure may indicate the tenant of the data repositories 105.

The payload database 118 may store the data encryption key 111 for decrypting the corresponding tenant of the data repositories 105. The key encryption key 124 and body encryption key 125 may also correspond to the tenant of the data repositories 105. The configuration database 116 may include tenant configuration databases corresponding to each of the respective tenants.

With reference to FIG. 2, a first partition 110 of a computing system may include data repositories 105. The data stored in the data repositories may be encrypted and may be decrypted or accessed using a data encryption key. The data in the data repositories may be encrypted using symmetric or asymmetric encryption. The data encryption key may be a private key or symmetric key.

A second partition 112 of the computing system may be an LSS. The second partition 112 may include a configuration database (as shown in FIG. 1 116). The configuration database may include a file 214, controller configuration database 212, and a tenant configuration database 220. The tenant configuration database 220 may include credentials or a configuration 222 to access an external system 122. The second partition 112 may further include a payload database 118.

In an embodiment, the first partition 110 and the second partition 112 may be bifurcated from each other. The first partition 110 and second partition 112 may be isolated from each other such that the accounts associated with the first partition 110 may not have access or visibility into the second partition 112 and vice versa.

In response to a procedure being executed by a DBMS, the procedure may attempt to access data repositories 105. As the data in the data repositories 105 may be encrypted, the procedure may attempt to retrieve the data encryption key from the second partition 112 (LSS). The data repositories 105 may include different data storage devices and different tenants. The data encryption key may correspond to any one of the data storage devices or different tenants. The procedure may identify which of the data storage device is being accessed and for which tenant.

The file 214 may be accessed to retrieve a private key to decrypt and access the configuration database. In response to accessing the configuration database, the controller configuration database 212 may identify the tenant configuration database 220 corresponding to the identified tenant. The controller configuration database 212 may decrypt and access the tenant configuration database 220.

As described above, the body encryption key for accessing the payload database 118 may be encrypted. In an embodiment, the body encryption key is stored in header information of the payload database 118. The header information is encrypted in two instances resulting in encrypted header information 130 and encrypted header information 132. The encrypted header information 130 may be encrypted using a public key of a first asymmetric key pair. The encrypted header information 132 may be encrypted using a public key of a second asymmetric key pair. Both the encrypted header information 130 and encrypted header information 132 include the body encryption key. The first asymmetric key pair may include a private key, key encryption key, stored in either the external system 122 or the tenant configuration database 220 for decrypting the encrypted header information 130 storing the body encryption key. The second asymmetric key pair may include a private key, second access key, stored by a client for decrypting the encrypted header information 132 including the body encryption key.

In an embodiment, the tenant configuration database 220 may store the key encryption key for decrypting the encrypted header information 130 including the body encryption key. The body encryption key may be used for decrypting and accessing the contents of the payload database 118. In another embodiment, the tenant configuration database 220 may include a configuration 222 for accessing the external system 122. The external system 122 may store the key encryption key for decrypting and accessing the body encryption key. The encrypted header information 130 of the payload database 118 may be transmitted to the external system 122. The external system 122 may use the key encryption key to decrypt the encrypted header information 130 to access the body encryption key. The external system 122 may transmit the body encryption key, in clear text, to the second partition 112. The second partition may decrypt the payload database 118 using the body encryption key.

In an embodiment, the client may store a second access key 126 in a secure location. In the event the external system 122 may not be accessed, the second access key 126 to decrypt the encrypted header information 132 to access the body encryption key. The body encryption key may be used to decrypt the contents of the payload database 118.

The payload database 118 may store data encryption keys 216a-d in the body 215. As described above, the data encryption keys 216a-d may be private or symmetric keys to decrypt the data stored in the data repositories 105. Each of the data encryption keys 216a-d may provide access to a different data storage device or may correspond to a different tenant. In this regard, the body encryption key may provide access to the corresponding data storage device or tenant identified by the procedure. The corresponding data encryption key may be transmitted to the first partition to decrypt the data of the respective data storage device or tenant.

Figure 3:
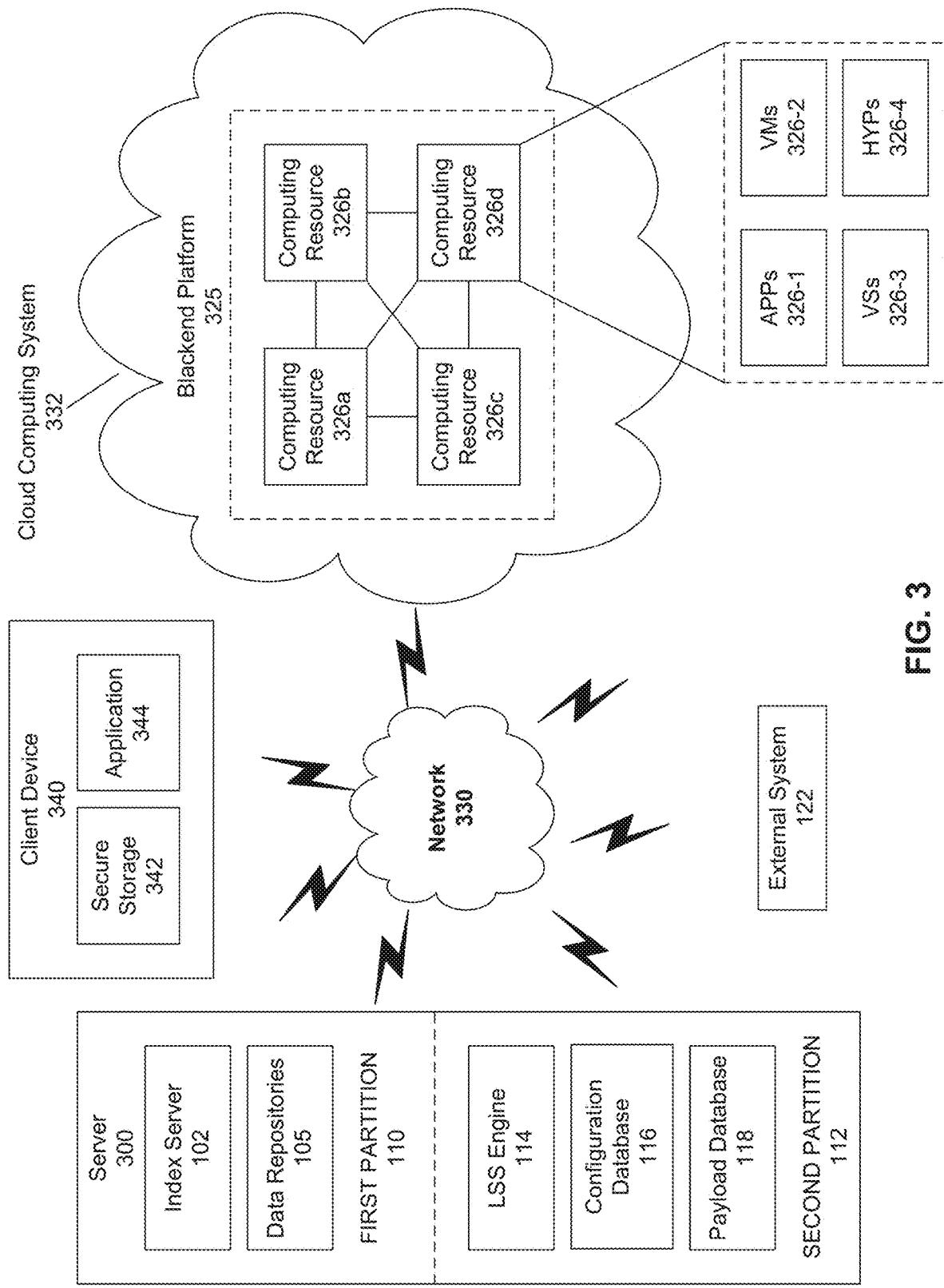
FIG. 3 is a block diagram of an example environment in which systems and/or methods described herein may be implemented according to an example embodiment.

FIG. 3 is a block diagram of an example environment in which systems and/or methods described herein may be implemented. The environment may include a server 300, a client device 340, an external system, a backend platform 325, a cloud computing environment 332, and a network 330. The devices of the environment may be connected through wired connections, wireless connections, or a combination of wired and wireless connections.

In an example embodiment, one or more portions of the network 330 may be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks.

The backend platform 325 may include one or more devices configured to host the application 344 and the LSS engine 114. The backend platform 325 may include a server or a group of servers. In an embodiment, the backend platform 325 may be hosted in a cloud computing environment 332. It may be appreciated that the backend platform 325 may not be cloud-based, or may be partially cloud-based.

The server 300 may include a first partition 110 of a computing system and a second partition 112 of the computing system. As a non-limiting example, operating system may be Linux®. The first partition 110 may include a DBMS 102 and data repositories 105. The second partition 112 may include an LSS engine 114, a configuration database 105 and a payload database 118. The LSS engine 114 may be an executable application configured to retrieve encryption keys from the configuration database 105 and payload database 118.

The client device 340 may include a secure storage 342 and an application 344. The secure storage 342 may be configured securely store a second access key. The application 344 may be an executable application configured to interface with the DBMS 102.

Each computing resource 326a-d includes one or more personal computers, workstations, computers, server devices, or other types of computation and/or communication devices. The computing resource(s) 326a-d may host the backend platform 325. The cloud resources may include compute instances executing in the computing resources 326a-d. The computing resources 326a-d may communicate with other computing resources 326a-d via wired connections, wireless connections, or a combination of wired or wireless connections.

Computing resources 326a-d may include a group of cloud resources, such as one or more applications ("APPs") 326-1, one or more virtual machines ("VMs") 326-2, virtualized storage ("VS") 326-3, and one or more hypervisors ("HYPs") 326-4.

Application 326-1 may include one or more software applications that may be provided to or accessed by user device 310 or the client device 360. In an embodiment, the messaging platform 100 may be executed locally on the client device 360 and the messaging platform 312 may be executed locally on the user device 310. Alternatively, the application 326-1 may eliminate a need to install and execute software applications on the user device 310 and client device 360. The application 326-1 may include software associated with backend platform 325 and/or any other software configured to be provided across the cloud computing environment 332. The application 326-1 may send/receive information from one or more other applications 326-1, via the virtual machine 326-2.

Virtual machine 326-2 may include a software implementation of a machine (e.g., a computer) that executes programs like a physical machine. Virtual machine 326-2 may be either a system virtual machine or a process virtual machine, depending upon the use and degree of correspondence to any real machine by virtual machine 326-2. A system virtual machine may provide a complete system platform that supports execution of a complete operating system (OS). A process virtual machine may execute a single program and may support a single process. The virtual machine 326-2 may execute on behalf of a user and/or on behalf of one or more other backend platforms 325, and may manage infrastructure of cloud computing environment 332, such as data management, synchronization, or long duration data transfers.

Virtualized storage 326-3 may include one or more storage systems and/or one or more devices that use virtualization techniques within the storage systems or devices of computing resource 326a-d. With respect to a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how administrators manage storage for end users. File virtualization may eliminate dependencies between data accessed at a file level and location where files are physically store. This may enable optimization of storage use, server consolidation, and/or performance of non-disruptive file migrations.

Hypervisor 326-4 may provide hardware virtualization techniques that allow multiple operations systems (e.g., "guest operating systems") to execute concurrently on a host computer, such as computing resource 326a-d. Hypervisor 326-4 may present a virtual operating platform to the guest operating systems, and may manage the execution of the guest operating systems multiple instances of a variety of operating systems and may share virtualized hardware resources.

In an embodiment, the data repositories 105 may store encrypted data. The data may be decrypted using a data encryption key stored in the payload database 118. The contents of the payload database 118 may be decrypted using a body encryption key. The body encryption key of the payload database 118 may be encrypted two separate times. In an embodiment, the body encryption key is stored in header information of the payload database 118. The header information is encrypted in two instances resulting in a first encrypted header information and a second encrypted header information. The first encrypted header information is encrypted using a public key of a first asymmetric key pair. The private key of the first asymmetric key pair may be the key encryption key. The key encryption key may be used for decrypting the first encrypted header information for accessing the body encryption key. The key encryption key may be stored in an external system 122 or in the configuration database 116.

The second encrypted header information may be encrypted using a public key of a second asymmetric key pair. The private key of the second asymmetric key pair may be a second access key. The second access key may be used to decrypt the second encrypted header information to access the body encryption key. The second access key may be stored in the secure storage 342 of the client device 340. As a non-limiting example, an asymmetric key pair including the second access key may be generated as follows:

sapgenpse get_pse -a RSA:2048:SHA256 -x CustomerSecretPasspphrase1 -p secondAccessKey.pse -noreq CN=Customer1

The public key of the asymmetric key pair is provided as a self-signed certificate that is part of the external key management configuration passed to the DBMS 102. The DBMS 102 forwards this certificate to LSS, which uses it to encrypt the body encryption key for encrypting the contents of the payload database 118. The client device may export the certificate with public key to file "secondAccessCertificate.pem" as follows:

sapgenpse export_own_cert -p secondAccessKey.pse -x CustomerSecretPassphrase1 -o secondAccessCertificate.pem The client device may store the second access key in a secure location such as the secure storage 342 as follows:

sapgenpse export_p8 -x CustomerSecretPassphrase1 -p secondAccessKey.pse secondAccessPrivateKey.pem Once the client's second access key and passphrase are stored the PSE file may be deleted.

A client may use the application 344 to interface with the DBMS 102. The application 344 may be a SQL client. The DBMS 102 may be a HANA index server. The DBMS may include an external system key management configuration. The external system 122 may be a key management system (KMS). A KMS may generate, distribute, and manage cryptographic keys for devices and applications. The KMS includes the backend functionality for key generation, distribution, and replacement as well as the client functionality for injecting keys, storing and managing keys on devices. The external system 122 may also be a hardware security module (HSM). The HSM a physical computing device that safeguards and manages digital keys.

The DBMS 102 may enable the fail-safe key in the external system 122 key management configuration as follows:

```
settingsJSON = {
  <KMS specific configuration goes here>
```

```
  "credentials": {
    "second_access_certificate" : "-----BEGIN CERTIFICATE-----
    <certificate content base64 encoded>
    -----END CERTIFICATE-----"
  }
}
```

As described above, the data repositories 105 may store data for multiple different tenants. The client may log on as a specific tenant using the application 342 to add the configuration to the external system 122 for the specific tenant. The configuration may be added to the external system 122 as follows:

ALTER SYSTEM ADD KEY MANAGEMENT CONFIGURATION KMS_WITH_SECOND_ACCESS PROPERTIES '<settingsJSON>'

The configuration may be activated as follows:

ALTER SYSTEM ACTIVATE KEY MANAGEMENT CONFIGURATION KMS_WITH_SECOND_ACCESS

The client may log on to the system DB using the application 342 to add the configuration to the external system 122 for the specific tenant. The configuration may be added to the external system 122 as follows:

ALTER DATABASE TEN1 ADD KEY MANAGEMENT CONFIGURATION KMS_WITH_SECOND_ACCESS PROPERTIES '<settingsJSON>'

The configuration may be activated as follows:

ALTER DATABASE TEN1 ACTIVATE KEY MANAGEMENT CONFIGURATION KMS_WITH_SECOND_ACCESS

In an embodiment, the application 344 may execute a procedure on the DBMS 102. The procedure may attempt to access a database of the data repositories 105 including encrypted data. The DBMS 102 may execute a call to the LSS engine 114 to access a data encryption key to decrypt the encrypted data of the database.

The LSS engine 114 may query the configuration database 116 to retrieve a key encryption key for decrypting the body encryption key of the payload database 118. The key encryption key may be stored in the external system 122. The configuration database 116 may store a configuration for accessing the external system 122. The LSS engine 114 may transmit the first encryption header information and use the configuration to access the external system 122. The external system 122 may store the key encryption key. The external system 122 may decrypt the first encrypted header information using the key encryption key to access the body encryption key. The external system 122 may transmit the body encryption key to the LSS engine 114. The LSS engine 114 may use the body encryption key to decrypt the contents of the payload database 118. The LSS engine 114 may retrieve the data encryption key for decrypting the database from the body of the payload database 118 and transmit the data encryption key to the DBMS 102.

In the event of emergency situations, the external system 122 may not be accessed. The emergency system may be power outages, system crash, the external system 122 has purged, or is no longer functional, and/or the like. In these situations, the LSS engine 114 may not be able to access the external system 122. The DBMS 102 may request the second access key from the client. The second access key may be copied from the secure storage 342 to a directory readable by a LSS system administrator. An LSS tenant may be restored as follows:

lssbackup -t TEN1 restoreWithSecondAccessKey
PayloadBackupFileName payload ConfigBackupFileName
SecondAccessPrivateKeyFileName.pem A LSS backup passphrase may be inserted and if a passphrase for a private key may be provided if one has been generated. The LSS engine 114 may use the second access key to decrypt the second encrypted header information to access the body encryption key of the payload database 118. The body encryption key may be used to decrypt the contents of the payload database 118.

As described above, the configuration database 116 may also be encrypted using a public key of an asymmetric key pair. The private key may be stored in a file in the second partition 112. The private key may be used to decrypt the contents of the configuration database 116.

The data encryption key used to decrypt the data of the data repositories 105, and the contents of the configuration database 116 may be rotated by the LSS engine 114 after a specified amount of time such that a new data encryption key is generated. The data of the data repositories 105 may be re-encrypted again using a new data encryption key and the configuration database contents may be encrypted again using a new asymmetric key pair. A new body encryption key to decrypt the contents of the payload database 118 may also be generated after a specified amount of time.

The asymmetric key pair for encrypting and decrypting the body encryption key is also rotated. As an example, the first asymmetric key pair for encrypting and decrypting the first encrypted header information including the body encryption key may be rotated by the external system 122 after a specified amount of time such that a new asymmetric key pair is generated. The first encrypted header information including the body encryption key is re-encrypted the new public key. Furthermore, a new key encryption key is generated and stored in the configuration database 116 or the external system 122.

In the event a new DBMS is installed and/or the DBMS 102 is updated an installation bundle is generated. The installation bundle includes file hashes. The configuration database 116 may match up all of the existing procedures for the DBMS 102 with using a list of procedures and the file hashes in the installation bundle. By doing so, the DBMS 102 is assigned the appropriate certificates corresponding to the private keys stored in the second partition 112.

Figure 4:
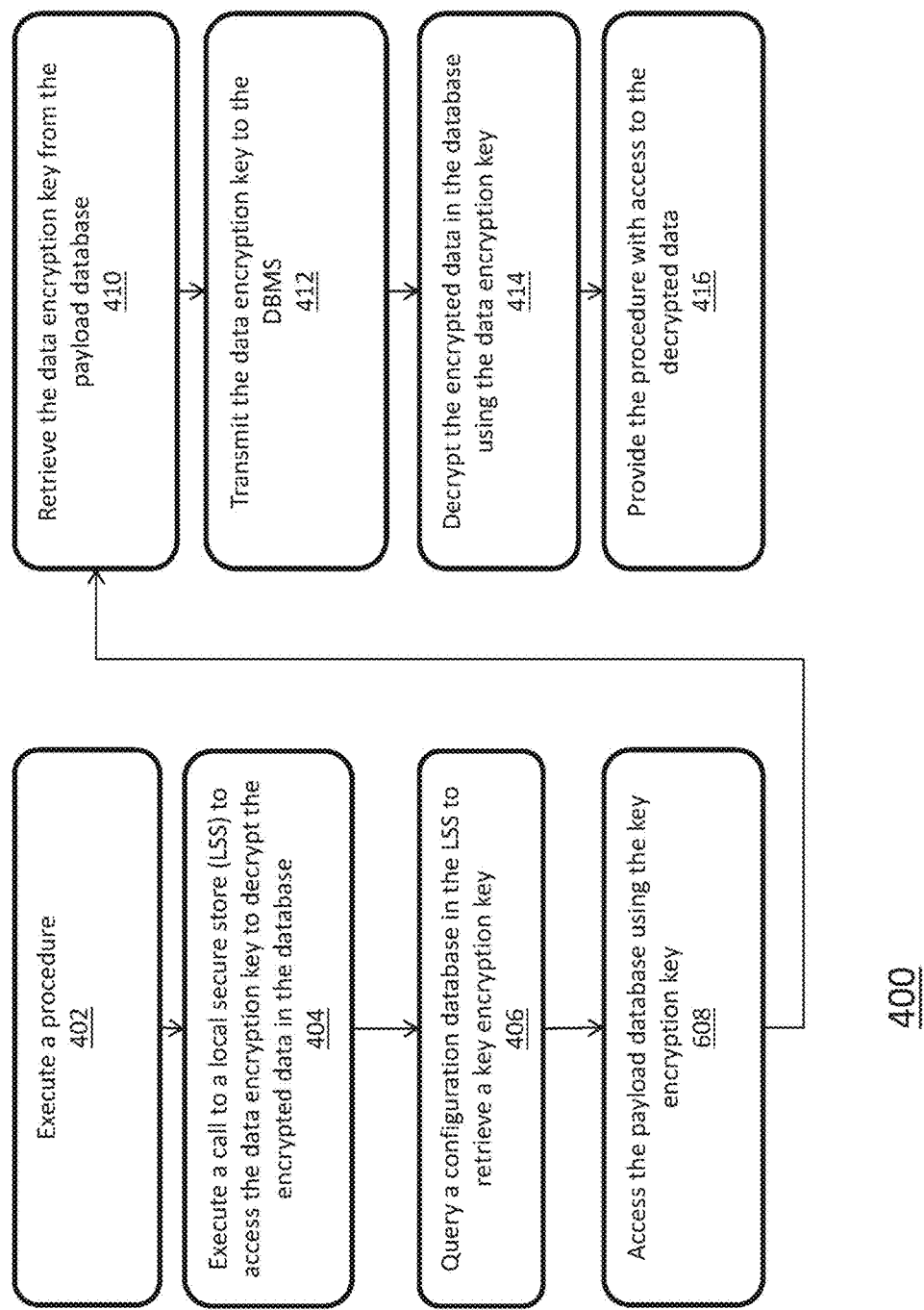
FIG. 4 is an example flowchart illustrating a process for accessing a data encryption key to decrypt data according to an embodiment.

FIG. 4 is an example flowchart 400 for accessing a data encryption key to decrypt data. It is to be appreciated the operations may occur in a different order, and some operations may not be performed. Merely as an example, the flow of data will be described with respect to FIGS. 1-3.

In operation 402, a DBMS may execute a procedure. The procedure may include calls to a database. Data stored inside the database may be encrypted. The encryption format may be asymmetric or symmetric. In this regard, a data encryption key may be needed to decrypt the data.

In operation 404, the DBMS may execute a call to a local secure store (LSS) to access the data encryption key to decrypt the encrypted data in the database, in response to the procedure's attempt to access the database. The call may be executed using authentic ports. The LSS and the database are isolated from each other. That is a first system administrator of the LSS may be prevented visibility into the database. A second administrator of the database may be prevented visibility into the LSS. This way, neither the first system administrator is able to view the data stored in the database nor is the second system administrator able to view the keys stored in the LSS to decrypt the data in the database.

In operation 406, a LSS engine may query a configuration database in the LSS to retrieve a key encryption key for accessing a payload database storing the data encryption key.

In operation 408, the LSS engine may access the payload database using the key encryption key.

In operation 410, the LSS engine may retrieve the data encryption key from the payload database.

In operation 412, the LSS engine may transmit the data encryption key to the DBMS.

In operation 414, the DBMS may decrypt the encrypted data in the database using the data encryption key.

In operation 416, the DBMS may provide the procedure with access to the decrypted data.

Figure 5:
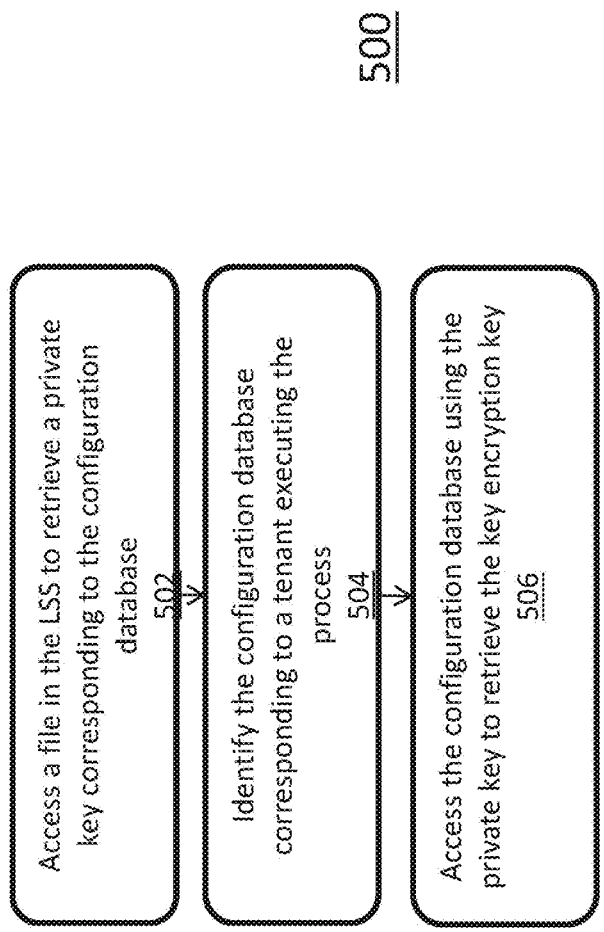
FIG. 5 is an example flowchart illustrating a process for accessing a configuration database according to an embodiment.

FIG. 5 is an example flowchart 500 for accessing a configuration database. It is to be appreciated the operations may occur in a different order, and some operations may not be performed. Merely as an example, the flow of data will be described with respect to FIGS. 1-3.

In operation 502, the LSS engine may access a file in the LSS to retrieve a private key corresponding to the configuration database.

In operation 504, the LSS engine may identify the configuration database corresponding to a tenant executing the process. For example, the database may be a multi-tenant database. The LSS may include multiple configuration databases. Each configuration database may correspond to a tenant.

In operation 506, the LSS engine may access the configuration database using the private key to retrieve the key encryption key.

Figure 6:
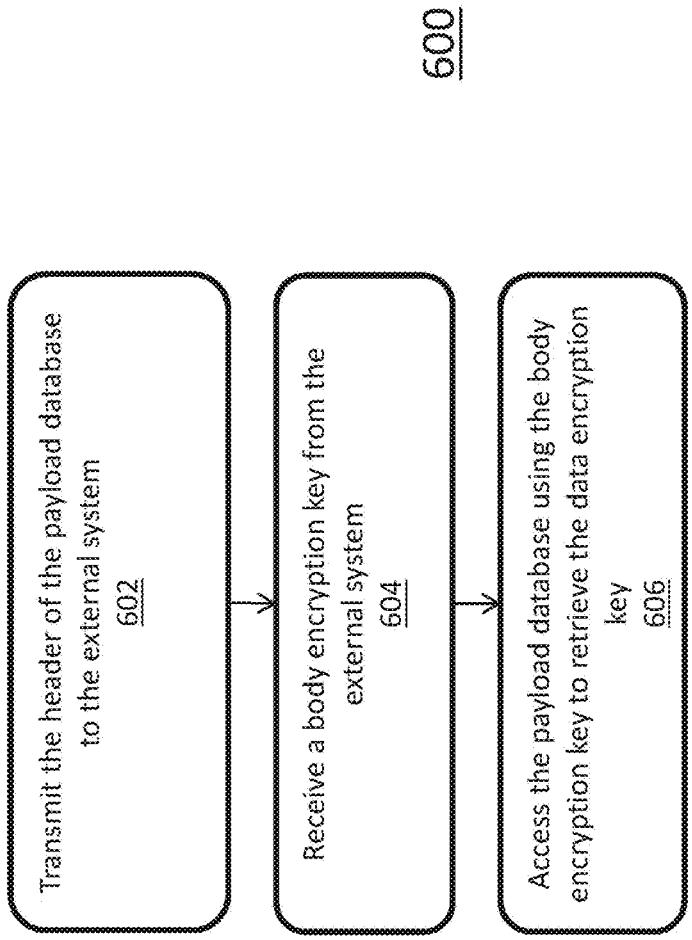
FIG. 6 is an example flowchart illustrating a process for retrieving a body encryption key from an external system according to an embodiment.

FIG. 6 is an example flowchart 600 for retrieving the body encryption key from an external system. It is to be appreciated the operations may occur in a different order, and some operations may not be performed. An LSS engine may connect with an external system to retrieve a private key for accessing the payload database. Merely as an example, the flow of data will be described with respect to FIGS. 1-3.

In operation 602, the LSS engine may transmit the header of the payload database to the external system.

In operation 604, the LSS engine may receive a body encryption key from the external system accessed by decrypting the header information using the key encryption key stored at the external system.

In operation 606, the LSS engine may access the payload database using the body encryption key to retrieve the data encryption key.

Figure 7:
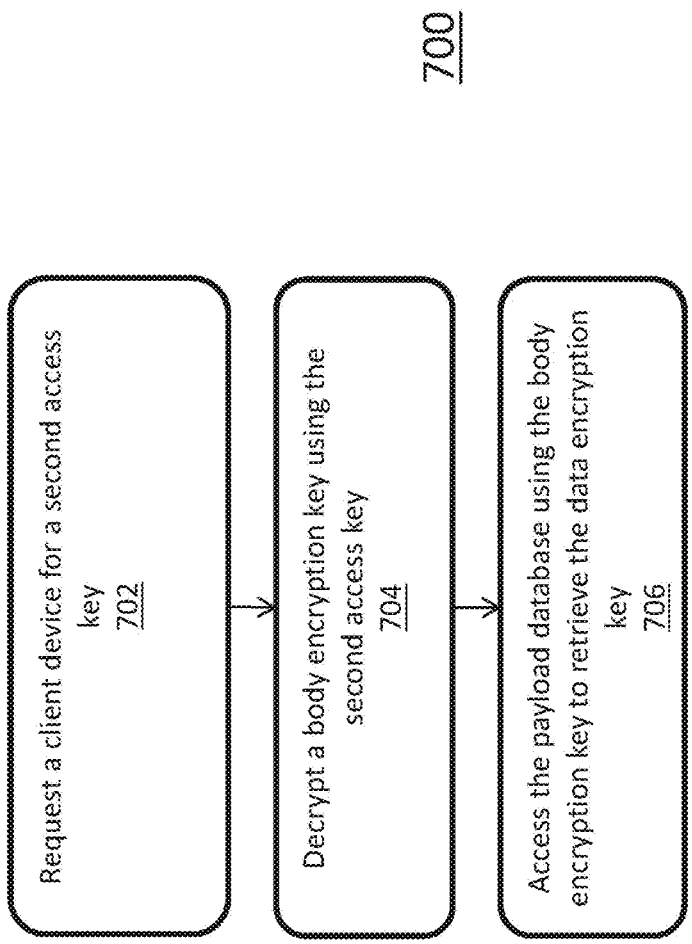
FIG. 7 is an example flowchart illustrating a process for accessing the payload database using a second access key according to an embodiment.

FIG. 7 is an example flowchart 700 for accessing the payload database using a second access key. It is to be appreciated the operations may occur in a different order, and some operations may not be performed. The external system may be inaccessible. Merely as an example, the flow of data will be described with respect to FIGS. 1-3.

In operation 702, the DBMS may request a client device for a second access key.

In operation 704, the LSS engine may decrypt a body encryption key using the second access key.

In operation 709, the LSS engine may access the payload database using the body encryption key to retrieve the data encryption key.

FIG. 8 is a block diagram of example components of device 800. One or more computer systems 800 may be used, for example, to implement any of the embodiments discussed herein, as well as combinations and sub-combinations thereof. Computer system 800 may include one or more processors (also called central processing units, or CPUs), such as a processor 804. Processor 804 may be connected to a communication infrastructure or bus 806.

Computer system 800 may also include user input/output device(s) 803, such as monitors, keyboards, pointing devices, etc., which may communicate with communication infrastructure 806 through user input/output interface(s) 802.

One or more of processors 804 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 800 may also include a main or primary memory 308, such as random access memory (RAM). Main memory 808 may include one or more levels of cache. Main memory 808 may have stored therein control logic (i.e., computer software) and/or data.

Computer system 800 may also include one or more secondary storage devices or memory 810. Secondary memory 810 may include, for example, a hard disk drive 812 and/or a removable storage device or drive 814.

Removable storage drive 814 may interact with a removable storage unit 818. Removable storage unit 818 may include a computer usable or readable storage device having stored thereon computer software (control logic) and/or data. Removable storage unit 818 may be program cartridge and cartridge interface (such as that found in video game devices), a removable memory chip (such as an EPROM or PROM) and associated socket, a memory stick and USB port, a memory card and associated memory card slot, and/or any other removable storage unit and associated interface. Removable storage drive 814 may read from and/or write to removable storage unit 818.

Secondary memory 810 may include other means, devices, components, instrumentalities or other approaches for allowing computer programs and/or other instructions and/or data to be accessed by computer system 800. Such means, devices, components, instrumentalities or other approaches may include, for example, a removable storage unit 822 and an interface 820. Examples of the removable storage unit 822 and the interface 820 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 800 may further include a communication or network interface 824. Communication interface 824 may enable computer system 800 to communicate and interact with any combination of external devices, external networks, external entities, etc. (individually and collectively referenced by reference number 828). For example, communication interface 824 may allow computer system 800 to communicate with external or remote devices 828 over communications path 826, which may be wired and/or wireless (or a combination thereof), and which may include any combination of LANs, WANs, the Internet, etc. Control logic and/or data may be transmitted to and from computer system 800 via communication path 826.

Computer system 800 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 800 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 800 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 800, main memory 308, secondary memory 810, and removable storage units 818 and 822, as well as tangible articles of manufacture embodying any combination of the foregoing. Such control logic, when executed by one or more data processing devices (such as computer system 800), may cause such data processing devices to operate as described herein.

Embodiments of the present invention have been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

The foregoing description of the specific embodiments will so fully reveal the general nature of the invention that others may, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer-implemented method comprising:

executing, by one or more computing devices, a procedure by a database management system (DBMS) attempting to access a database storing encrypted data, wherein the database resides in a first partition of a bifurcated computing system;

executing, by the one or more computing devices, a call to a local secure store (LSS) to access a data encryption key to decrypt the encrypted data in the database, in response to the procedure's attempt to access the database, wherein the LSS resides in a second partition of the bifurcated computing system and wherein the first and second partition are visually isolated from each other;

determining that an external system, external to both the LSS and the DBMS, is storing a key encryption key for accessing a payload database storing the data encryption key;

querying, by the one or more computing devices, the external system to retrieve the key encryption key for accessing the payload database;

determining that the external system is inaccessible;

determining that the payload database can be decrypted using either the key encryption key or a second access key stored separately from the key encryption key on a different system;

accessing, by the one or more computing devices, the payload database using the second access key responsive to the determining that the external system is inaccessible;

retrieving, by the one or more computing devices, the data encryption key from the payload database;

transmitting, by the one or more computing devices, the data encryption key to the DBMS;

decrypting, by the one or more computing devices, the encrypted data in the database using the second access key; and providing, by the one or more computing devices, the procedure with access to the decrypted data.

2. The method of claim 1, in response to executing the call to the LSS to access the data encryption key, the method further comprising:

accessing, by the one or more computing systems, a file in the LSS to retrieve a private key;

identifying, by the one or more computing systems, the configuration database corresponds with a tenant indicated in the procedure; and accessing, by the one or more computing systems, the configuration database using the private key to retrieve the key encryption key.

3. The method of claim 2, wherein the configuration database stores the key encryption key.

4. The method of claim 2, wherein the configuration database stores a configuration for connecting to an external system storing the key encryption key.

5. The method of claim 4, further comprising:

transmitting, by the one or more computing devices, header information of the payload database to the external system;

receiving, by the one or more computing devices, a body encryption key from the external system accessed by decrypting using the header information using the key encryption key; and accessing, by the one or more computing devices, the payload database using the body encryption key to retrieve the data encryption key.

6. The method of claim 4, in response to the external system being inaccessible the method further comprising:

requesting, by the one or more computing devices, a client device for a second access key;

decrypting, by the one or more computing devices, a body encryption key using the second access key; and accessing, by the one or more computing devices, the payload database using the body encryption key to retrieve the data encryption key.

7. The method of claim 1, wherein a first system administrator is associated with the database and a second system administrator is associated with the LSS.

8. The method of claim 7, further comprising:

preventing, by the one or more computing devices, the first system administrator visibility into the LSS; and preventing, by the one or more computing devices, the second system administrator visibility into the database.

9. A system comprising:

a memory;

a processor copulated to the memory, the processor configured to:

execute a procedure by a database management system (DBMS) attempting to access a database storing encrypted data, wherein the database resides in a first partition of a bifurcated computing system;

execute a call to a local secure store (LSS) to access a data encryption key to decrypt the encrypted data in the database, in response to the procedure's attempt to access the database, wherein the LSS resides in a second partition of the bifurcated computing system and wherein the first and second partition are visually isolated from each other;

determine that an external system, external to both the LSS and the DBMS, is storing a key encryption key for accessing a payload database storing the data encryption key;

query the external system to retrieve the key encryption key for accessing the payload database;

determine that the external system is inaccessible;

determine that the payload database can be decrypted using either the key encryption key or a second access key stored separately from the key encryption key on a different system;

access the payload database using the second access key responsive to the determining that the external system is inaccessible;

retrieve the data encryption key from the payload database;

transmit the data encryption key to the DBMS;

decrypt the encrypted data in the database using the second access key; and provide the procedure with access to the decrypted data.

10. The system of claim 9, in response to executing the call to the LSS to access the data encryption key, the processor further configured to:

access a file in the LSS to retrieve a private key;

identify the configuration database corresponds with a tenant indicated in the procedure, and access the configuration database using the private key to retrieve the key encryption key.

11. The system of claim 10, wherein the configuration database stores the key encryption key.

12. The system of claim 10, wherein the configuration database stores a configuration for connecting to an external system storing the key encryption key.

13. The system of claim 12, the processor further configured to:
   transmit header information of the payload database to the external system;
   receive a body encryption key from the external system accessed by decrypting the header information using the key encryption key; and
   access the payload database using the body encryption key to retrieve the data encryption key.

14. The system of claim 12, in response to the external system being inaccessible the processor further configured to:
   request a client device for a second access key;
   decrypt a body encryption key using the second access key; and
   access the payload database using the body encryption key to retrieve the data encryption key.

15. The system of claim 9, wherein a first system administrator is associated with the database and a second system administrator is associated with the LSS.

16. The system of claim 15, the processor further configured to:
   prevent the first system administrator visibility into the LSS; and
   prevent the second system administrator visibility into the database.

17. A non-transitory computer-readable medium storing instructions that when executed by one or more processors of a device cause the one or more processors to:
   execute a procedure by a database management system (DBMS) attempting to access a database storing encrypted data, wherein the database resides in a first partition of a bifurcated computing system;
   execute a call to a local secure store (LSS) to access a data encryption key to decrypt the encrypted data in the database, in response to the procedure's attempt to access the database, wherein the LSS resides in a second partition of the bifurcated computing system and wherein the first and second partition are visually isolated from each other;
   determine that an external system, external to both the LSS and the DBMS, is storing a key encryption key for accessing a payload database storing the data encryption key;
   query the external system to retrieve the key encryption key for accessing the payload database;
   determine that the external system is inaccessible;
   determine that the payload database can be decrypted using either the key encryption key or a second access key stored separately from the key encryption key on a different system;
   access the payload database using the second access key responsive to the determining that the external system is inaccessible;
   retrieve the data encryption key from the payload database;
   transmit the data encryption key to the DBMS;
   decrypt the encrypted data in the database using the second access key; and
   provide the procedure with access to the decrypted data.

18. The non-transitory computer readable medium of claim 17, in response to executing the call to the LSS to access the data encryption key, the instructions cause the processor to:
   access a file in the LSS to retrieve a private key;
   identify the configuration database corresponds with a tenant indicated in the procedure; and
   access the configuration database using the private key to retrieve the key encryption key.

19. The non-transitory computer readable medium of claim 18, wherein the configuration database stores a configuration for connecting to an external system storing the key encryption key.

20. The method of claim 1, wherein the second access key is embedded in a link.

* * * * *